United States Patent [19]

Edelmann

[11] 4,434,750
[45] Mar. 6, 1984

[54] THERMOSTAT HOUSING ASSEMBLY

[76] Inventor: Karl R. Edelmann, 1468 Chestnut La., Rochester, Mich. 48063

[21] Appl. No.: 404,463

[22] Filed: Aug. 2, 1982

[51] Int. Cl.³ .................................................. F01P 7/16
[52] U.S. Cl. ................................. 123/41.02; 123/41.1; 236/34.5
[58] Field of Search ............... 123/41.02, 41.08, 41.09, 123/41.1; 236/34, 34.5, 93 R, 101 R, 101 C

[56] References Cited

U.S. PATENT DOCUMENTS

| | | | |
|---|---|---|---|
| 1,355,250 | 10/1920 | O'Donnell | 236/34.5 |
| 1,731,214 | 10/1929 | Eshbaugh | 236/34 |
| 1,811,366 | 6/1931 | Palm | 236/34 |
| 2,168,999 | 8/1939 | MacDonald | 236/34 |
| 2,622,572 | 12/1952 | Nallinger | 236/34 |
| 2,735,619 | 2/1956 | Schutt et al. | 236/34 |
| 4,300,718 | 11/1981 | Beyer | 123/41.09 |

*Primary Examiner*—William A. Cuchlinski, Jr.
*Attorney, Agent, or Firm*—Harness, Dickey & Pierce

[57] ABSTRACT

A thermostat housing assembly including a base member having a hollow tubular portion with a longitudinal axis and a first end opening disposed substantially on the axis and a second end opening offset from the axis at a predetermined angle, and an intermediate member including a cylindrical body portion and a first end portion in mating engagement with and connected to the second opening so that the intermediate member is disposed at the predetermined angle in relation to the longitudinal axis of the base member. Said intermediate member further includes a second end portion. A top stack member includes a hollow cylindrical portion having a port therethrough between the ends thereof and a cylindrical extension secured about the port. The top stack member further includes a first tapered end portion seated within and connected to the second end portion of the intermediate member so that the cylindrical end portion extends from the top stack member at a second predetermined angle in relation to the axis of the base member.

The instant invention further provides a method of manufacturing the thermostat housing including the steps of seating the first end portion of the intermediate member within the second opening of the base member to dispose the intermediate member at a predetermined angle relative to the longitudinal axis of the base member and seating the tapered end portion of the top stack member within the second end portion of the intermediate member to dispose the cylindrical extension of the top stack member at a second predetermined angle in relation to the longitudinal axis of the base member and securing the members together.

13 Claims, 5 Drawing Figures

THERMOSTAT HOUSING ASSEMBLY

BACKGROUND OF THE INVENTION

1. Field of the Invention

The instant invention relates to a housing for a thermostat. More particularly, the housing may be disposed outside of a radiator housing for regulating the circulation of coolant between the radiator and an engine block.

2. Description of the Prior Art

Up until recently, thermostats were disposed within the radiator assembly of most automobiles. The thermostat controlled the flow of coolant, the path of the flow being dependent upon the temperature of the coolant. Recently, to solve car design problems, the thermostat has been located outside of the radiator assembly. Accordingly, the thermostat is disposed within a housing through which coolant is circulated. The housing shunts the fluid under the control of the thermostat. The prior art thermostat housings have been made from integral die cast aluminum castings. A problem exists with such housing structures in that the casted housings are totally inflexible and not adaptable to various engine designs. The result is that it is necessary to provide specific castings of the entire housings for specific automobile and engine designs. Thus, these housings are quite expensive and inefficient for suiting a variety of automobile and engine designs.

The subject construction is an improvement over the prior art housings since it can be adapted to be used in most engine designs which require such a housing.

SUMMARY OF THE INVENTION

A thermostat housing assembly including a base member including a hollow tubular portion having a longitudinal axis and a first end opening disposed substantially on the axis and a second end opening offset from the axis at a predetermined angle, and an intermediate member including a cylindrical body portion and a first end portion in mating engagement with and connected to the second opening so that the intermediate member is disposed at the predetermined angle in relation to the longitudinal axis of the base member. The intermediate member further includes a second end portion. A top stack includes a hollow cylindrical portion having a port therethrough between the ends thereof and a cylindrical extension secured thereto about the port. The top stack member includes a first tapered end portion seated within and connected to the second end portion of the intermediate member so that the cylindrical extension extends from the top stack member at a predetermined angle in relation to the axis of the base member.

The instant invention further provides a method of manufacturing the thermostat housing including the steps of seating the first end portion of the intermediate member within the second opening of the base member to dispose the intermediate member at the predetermined angle relative to the longitudinal axis of the base member and seating the tapered end portion of the top stack member within the second end portion of the intermediate member to dispose the cylindrical extension of the top stack member at a second predetermined angle in relation to the longitudinal axis of the base member and securing the members together.

PRIOR ART STATEMENT

The U.S. Pat. No. 1,731,214 to Eshbaugh, U.S. Pat. No. 1,811,366 to Palm, and U.S. Pat. No. 2,168,999 to MacDonald teach thermostat housing constructions made from stamped metal parts, the parts being soldered or otherwise secured together at their junctions. The U.S. Pat. No. 1,355,250 to O'Donnell teaches a thermostat housing including an angular base member, an intermediate member, and a top stack member, the top stack member having a cylindrical extension extending therefrom. None of the aforementioned patents discloses the specific combination of members comprising the thermostat housing of the instant invention whereby the instant invention may be adapted to a variety of engine designs. Furthermore, none of the aforementioned prior art patents discloses the specific method of manufacturing the subject thermostat housing whereby a single housing may be adapted to various configurations and locations of the engine block in relation to the radiator assembly.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

A thermostat housing assembly constructed in accordance with the instant invention is generally shown at 10.

The assembly 10 includes basically three members made from sheet metal formed by conventional progressive dies; that is, a base member generally shown at 12, an intermediate member generally shown at 14, and a top stack member generally shown at 16.

Figure 1:
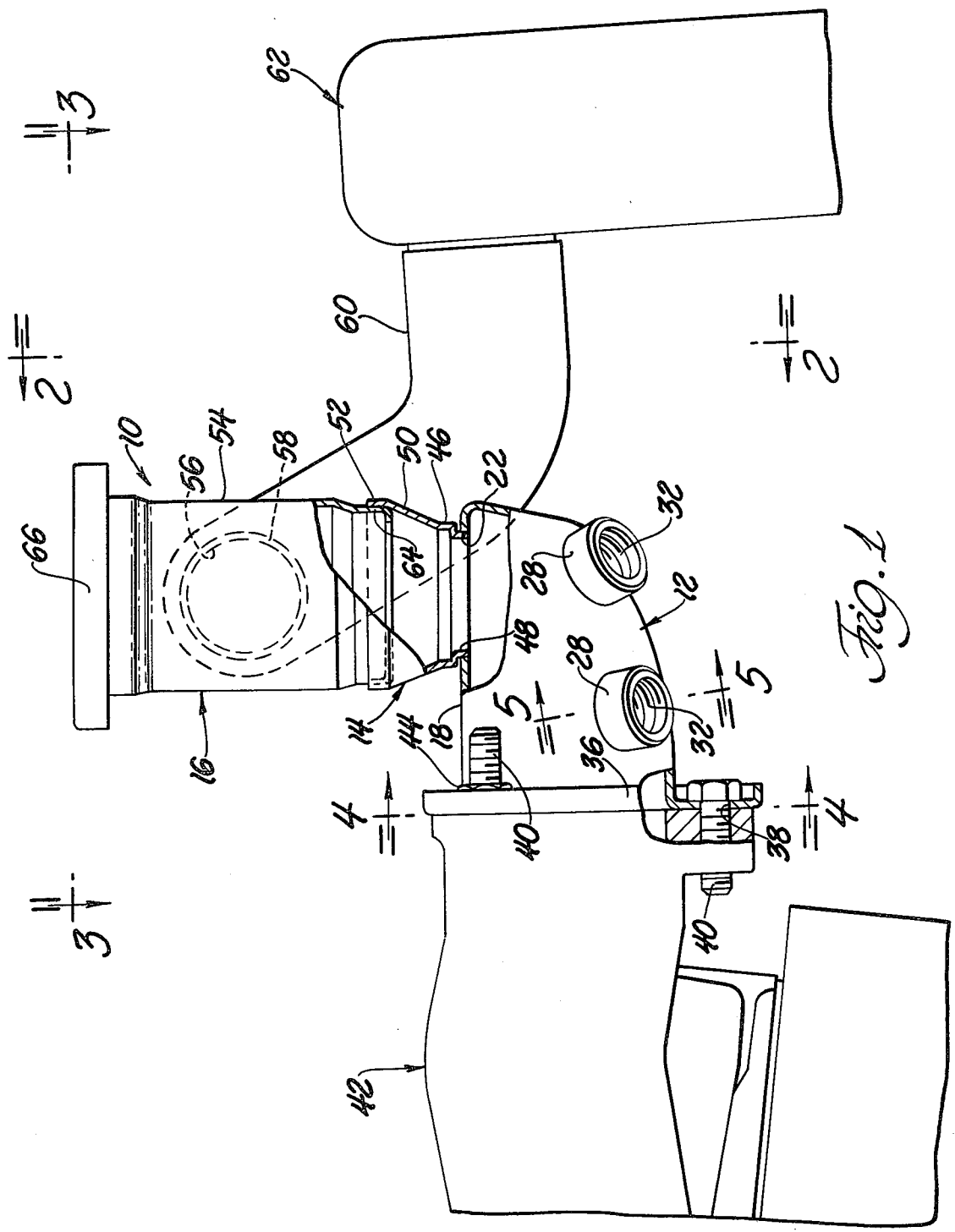
FIG. 1 is an elevational partially broken-away view of the subject thermostat housing in fluid communication with an engine block and a radiator assembly.
Figure 2:
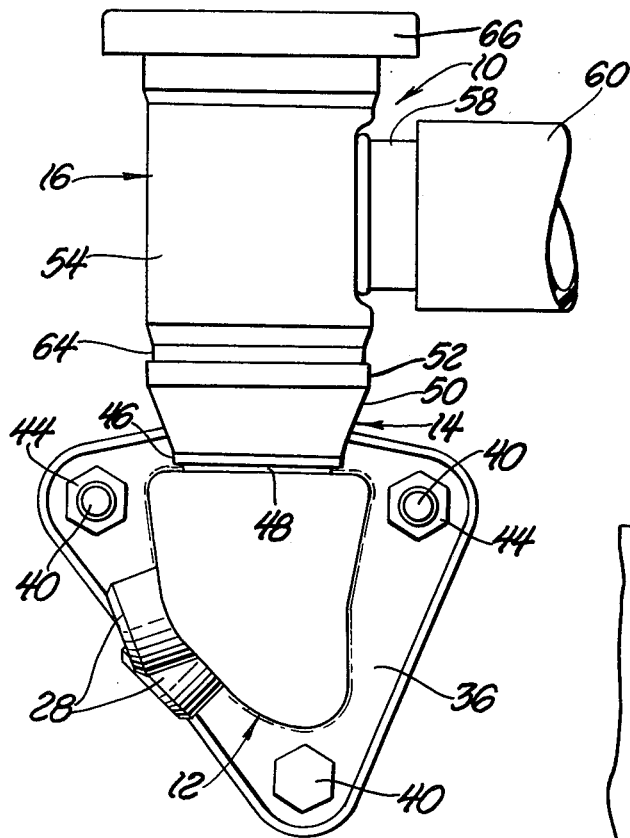
FIG. 2 is an elevational view taken substantially along line 2—2 of FIG. 1.
Figure 3:
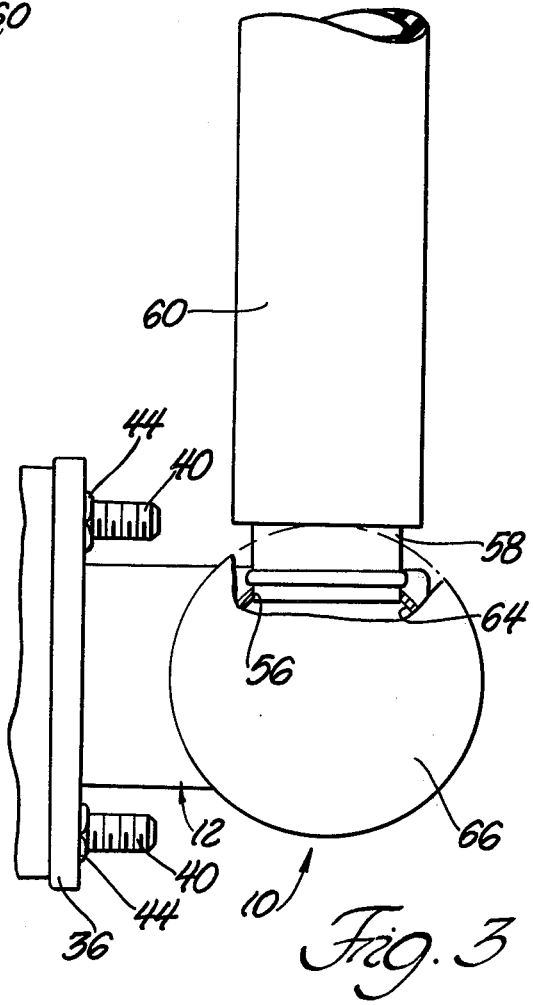
FIG. 3 is a plan view taken substantially along line 3—3 of FIG. 1.
Figure 4:
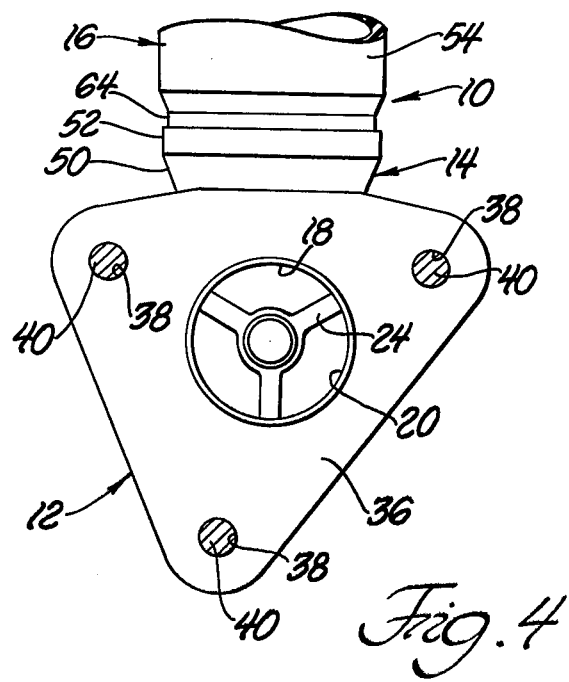
FIG. 4 is a fragmentary cross sectional view taken substantially along line 4—4 of FIG. 1.
Figure 5:
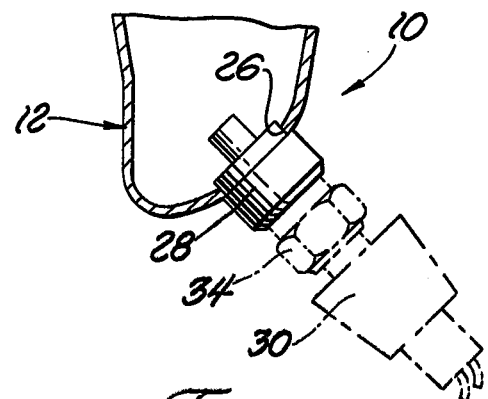
FIG. 5 is a fragmentary cross sectional view taken substantially along line 5—5 of FIG. 1.

The base member 12 includes a hollow tubular portion 18 having a longitudinal axis. The base member 12 further includes a first end opening 20, shown in FIG. 4, on the longitudinal axis defined by the tubular portion 18. The base member 12 also includes a second opening 22, as shown in FIG. 1, the second opening being offset from the longitudinal axis defined by the tubular portion 18 at a predetermined angle relative to the longitudinal axis. A webbing 24 extends across the interior of the tubular portion 18 for supporting a thermostat assembly within the thermostat housing assembly 10. The thermostat assembly would be seated upon and connected to the webbing 24. The base member 12 includes several bores 26 therethrough and neck members 28 connected about the bores 26 for supporting electrical connections 30 to the thermostat assembly 10. Each neck member 28 includes a threaded inner surface 32 adapted to retain the electrical connector 30 in mating engagement therewith. The connector 30 may include an adapter 34 secured thereto to provide a proper engagement with the neck member 28.

The base member 12 further includes a flange 36 extending radially outwardly from the first end opening 20. The flange 36 has a plurality of holes 38 therethrough for receiving connecting bolts 40, the connecting bolts 40 securing the base portion 12 to an engine assembly generally shown at 42 in FIG. 1. Nut members 44 retain the bolts 40 in place. The nut members 44 may be removed from the bolts to allow for replacement or service of the assembly 10.

The intermediate member 14 includes a body portion 46. The intermediate member 14 also includes a first end portion 48 having a recessed diameter relative to the body portion 46. The end portion 48 is in mating engagement with and connected to the second opening 22 of the base portion 12 so that the intermediate member 14 is disposed at the predetermined angle in relation to the longitudinal axis defined by the tubular portion 18 of the base member 12. In other words, the angular relationship of the intermediate member 14 to the base member 12 is dependent upon the angle of the opening 22 relative to the longitudinal axis defined by the tubular portion 18 of the base member 12. Accordingly, a base member 12 may be manufactured so as to have the opening 22 at any predetermined angle relative to the tubular portion 18, thereby positioning the intermediate member 14 at the predetermined angle relative to the base member 12.

The intermediate member 14 further includes a second frusto-conical end portion 50. An annular flange 52 may be disposed at the end of the frusto-conical end portion 50.

The top stack member 16 includes a hollow cylindrical portion 54 having a port 56 extending therethrough. A cylindrical extension or adapter member 58 is secured to the top stack member 16 about the port 56. The cylindrical extension 58 is adapted to have a hose 60 mounted thereon whereby the hose 60 has one end secured to the cylindrical extension 58 and a second end connected to a radiator assembly generally indicated at 62. The top stack member 16 further includes a first tapered end portion 64 seated within and connected to the second end portion 50 of the intermediate member 14 so that the cylindrical extension 58 extends from the top stack member 16 at a second predetermined angle in relation to the longitudinal axis defined by the tubular portion 18 of the base member 12. In other words, rotation of the top stack member 16 within the second end portion 50 of the intermediate member 14 prior to securing the top stack member 16 to the intermediate member 14 positions the cylindrical extension 58 at a predetermined angle relative to the base member 12. Thus, a single housing assembly 10 can be adapted to different engine designs and positioning of radiator assemblies relative to the engine structures.

The top stack member 16 further includes a second end opening 64 and a cap member 66 removably mounted over the second end opening 64 for perfecting a seal thereabout.

The instant invention further provides a method of manufacturing the subject thermostat housing 10. The first end portion 48 of the intermediate member 14 is seated within the second opening 22 of the base member 12 to dispose the intermediate member 14 at the predetermined angle relative to the longitudinal axis of the tubular portion 18 of the base member 12. The tapered end portion 64 of the top stack member 16 is then seated within the second end portion 50 of the intermediate member 14 to dispose the cylindrical extension 58 of the top stack member 16 at a second predetermined angle in relation to the longitudinal axis of the base member 12 so as to properly position the cylindrical extension 58 for the mounting of the hose member 60 thereon. Finally, the members 12, 14 and 16 are secured together by soldering or other means well known to the art. A thermostat assembly may be mounted on the webbing 24 prior to the soldering together of the members 12, 14 and 16. The base member 12 is then bolted onto the engine 42 by bolts 40 and nuts 46, and the hose 60 is mounted on the cylindrical extension 58. Finally, the cap member 66 can be mounted on the top stack member 16.

In operation, if a new model design requires that the radiator 62 be located in a position much higher than the position shown in FIG. 1, the height of the top stack member 16 may be increased by manufacturing a new stamping of only the top stack member 16 and not replacing the entire housing as would be required by prior art construction. A different situation would be that a new model design would result in a different spacial relationship between the engine 42 and the radiator 62, thus causing the angle between the top stack member 16 and the base member 12 to be different. To solve this problem, the base member 12 would be replaced with a base member having connecting ports to the intermediate member 14 which are angled so as to result in a housing adapted to the situation. Another problem exists when the radiator is located in a position requiring the cylindrical extension 14 to be rotated in relation to the remainder of the housing. This problem is solved by merely rotating the top stack member 16 to properly position the cylindrical extension 58 before brazing or soldering the top stack member 16 to the intermediate member 14. Thus, the subject thermostat housing 10 may be adapted to various engine and automobile designs by merely moving or rotating or extending parts before securing the parts together.

The instant invention has been described in an illustrative manner and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

The embodiments of the invention in which and exclusive property or privilege is claimed are defined as follows:

1. A thermostat housing assembly comprising:
   a base member including a hollow tubular portion having a longitudinal axis and a first end opening disposed substantially on said axis and a second end opening offset from said axis at a predetermined angle;
   an intermediate member including a body portion and a first end portion in mating engagement with and connected to said second opening so that said intermediate member is disposed at said predetermined angle in relation to said longitudinal axis of said base member, said intermediate member further including a second end portion; and
   a top stack member including a hollow cylindrical portion having a port therethrough between the ends thereof and a cylindrical extension secured thereto about said port, said top stack member including a first tapered end portion seated within and connected to said second end portion of said intermediate member so that said cylindrical extension extends from said top stack member at a second predetermined angle in relation to said axis of said base member.

2. An invention as described in claim 1 wherein said base member includes mounting means for securing said first end opening to a coolant passageway of an engine.

3. An invention as described in claim 2 wherein said mounting means includes a flange extending radially outwardly from said first end opening, said flange including openings for receiving fastener members therethrough.

4. An invention as defined in claim 1 wherein said base member includes webbing extending across the interior of said hollow tubular portion for supporting a thermostat assembly within said thermostat housing assembly.

5. An invention as defined in claim 1 wherein said hollow tubular portion of said base member includes at least one bore therethrough and a neck member connected about said bore, said neck member being adapted to mate with an end fitting of an electrical line.

6. An invention as defined in claim 5 wherein said neck member includes a threaded inner bore.

7. An invention as defined in claim 1 wherein said first end portion of said intermediate member has a recessed diameter in relation to said cylindrical body portion.

8. An invention as defined in claim 1 wherein said second end portion of said intermediate member is substantially frusto-conical.

9. An invention as defined in claim 1 wherein said top stack member includes a second end opening and a cap member removably mounted over said second end opening for perfecting a seal thereabout.

10. An invention as defined in claim 1 wherein said base member and said intermediate member and said top stack member are made from aluminum.

11. An invention as defined in claim 1 wherein said base member and said intermediate member and said top stack member are made from a plastic.

12. An invention as defined in claim 1 wherein said body portion of said intermediate member is substantially frusto-conical when viewed in cross section.

13. A thermostat housing assembly comprising:
a base member including a hollow tubular portion having a longitudinal axis and a first end opening on said axis and a second opening offset from said axis at a predetermined angle in relation to said axis and a webbing extending across the interior thereof for supporting a thermostat assembly within said thermostat housing assembly and at least one bore therethrough and neck member connected about said bore including a threaded inner surface, said base member further including a flange extending radially outwardly from said first end opening;
an intermediate member including a body portion and a first end portion having a recessed diameter relative to said body portion and in mating engagement with and connected to said second opening so that said intermediate member is disposed at said predetermined angle in relation to said axis of said base member, said intermediate member further including a second frusto-conical end portions; and
a top stack member including a hollow cylindrical portion having a port therethrough and a cylindrical extension secured thereto and about said port, said top stack member further including a first tapered end portion seated within and connected to said second end portion of said intermediate member so that said cylindrical extension extends from said top stack member at a second predetermined angle in relation to said axis of said base member, said top stack member including a second end opening and a cap member removably mounted over said second end opening for perfecting a seal thereabout.

* * * * *

UNITED STATES PATENT AND TRADEMARK OFFICE
CERTIFICATE OF CORRECTION

PATENT NO. : 4,434,750

DATED : March 6, 1984

INVENTOR(S) : Karl R. Edelmann

It is certified that error appears in the above-identified patent and that said Letters Patent is hereby corrected as shown below:

Column 1, line 48, after "stack" insert -- member --.

Column 4, line 51, "and" should be -- an --.

Column 6, line 29, "portions" should be -- portion --.

Signed and Sealed this

Twenty-sixth Day of June 1984

[SEAL]

Attest:

GERALD J. MOSSINGHOFF

Attesting Officer

Commissioner of Patents and Trademarks